(12) United States Patent
Jang et al.

(10) Patent No.: US 9,414,410 B2
(45) Date of Patent: Aug. 9, 2016

(54) OPERATING METHOD FOR WIRELESS COMMUNICATION SYSTEM USING IMPROVED CARRIER AGGREGATION TECHNOLOGY AND DEVICE THEREFOR

(71) Applicant: Samsung Electronics Co., Ltd., Suwon-si, Gyeonggi-do (KR)

(72) Inventors: Jae Hyuk Jang, Suwon-si (KR); Soeng-Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/347,842

(22) PCT Filed: Oct. 10, 2012

(86) PCT No.: PCT/KR2012/008223
§ 371 (c)(1),
(2) Date: Mar. 27, 2014

(87) PCT Pub. No.: WO2013/055108
PCT Pub. Date: Apr. 18, 2013

(65) Prior Publication Data
US 2014/0233524 A1 Aug. 21, 2014

Related U.S. Application Data

(60) Provisional application No. 61/545,363, filed on Oct. 10, 2011, provisional application No. 61/559,674, filed on Nov. 14, 2011, provisional application No. 61/563,345, filed on Nov. 23, 2011, provisional application No. 61/600,179, filed on Feb. 17, 2012.

(51) Int. Cl.
*H04W 4/00* (2009.01)
*H04W 74/08* (2009.01)
*H04W 52/36* (2009.01)
(Continued)

(52) U.S. Cl.
CPC ....... *H04W 74/0833* (2013.01); *H04J 11/0053* (2013.01); *H04W 52/365* (2013.01); *H04L 5/001* (2013.01); *H04W 24/10* (2013.01); *H04W 52/0206* (2013.01)

(58) Field of Classification Search
CPC .................................................. H04W 52/365
See application file for complete search history.

(56) References Cited

U.S. PATENT DOCUMENTS

2010/0124188 A1* 5/2010 Wu ............... H04W 74/002
370/328
2011/0134774 A1* 6/2011 Pelletier ............. H04W 52/365
370/252

(Continued)

FOREIGN PATENT DOCUMENTS

CN 102104905 A 6/2011
EP 2 627 115 A1 8/2013
(Continued)

*Primary Examiner* — Maharishi Khirodhar
(74) *Attorney, Agent, or Firm* — Jefferson IP Law, LLP

(57) ABSTRACT

The present invention relates to a random access processing method, a processing method for processing different time-division setups, a method for reporting downlink timing differences, and a method for transmitting a sounding reference signal, when carrier aggregation technology is used in a wireless communication system. Through the present invention, a user can use improved carrier integration technology, and communicate without an erroneous operation.

12 Claims, 12 Drawing Sheets

(51) Int. Cl.
*H04J 11/00* (2006.01)
*H04W 24/10* (2009.01)
*H04W 52/02* (2009.01)
*H04L 5/00* (2006.01)

(56) References Cited

U.S. PATENT DOCUMENTS

2011/0243016 A1* 10/2011 Zhang et al. ............... 370/252
2011/0243106 A1* 10/2011 Hsu ..................... H04L 5/0096
370/336
2013/0039294 A1* 2/2013 Wang ................ H04W 74/0833
370/329
2013/0188570 A1 7/2013 Zhao et al.
2014/0211738 A1* 7/2014 Park .................... H04W 52/365
370/329

FOREIGN PATENT DOCUMENTS

| WO | 2011-050921 | A1 | 5/2011 |
| WO | 2011-063244 | A2 | 5/2011 |
| WO | 2011-105856 | A2 | 9/2011 |
| WO | 2011-122910 | A2 | 10/2011 |

* cited by examiner ial application filed on Oct. 10, 2011, in the U.S. Patent and Trademark Office and assigned Ser. No. 61/545,363, a U.S. Provisional application filed on Nov. 14, 2011, in the U.S. Patent and Trademark Office and assigned Ser. No. 61/559,674, a U.S. Provisional application filed on Nov. 23, 2011, in the U.S. Patent and Trademark Office and assigned Ser. No. 61/563,345, and a U.S. Provisional application filed on Feb. 17, 2012, in the U.S. Patent and Trademark Office and assigned Ser. No. 61/600,179, the entire disclosure of each of which is hereby incorporated by reference.

TECHNICAL FIELD

The present invention relates to a wireless communication system and, in particular, to an operation method of a terminal using a plurality of carriers in a Long Term Evolution (LTE) system.

BACKGROUND ART

With the rapid advance of wireless communication technology and the evolution of communication system, LTE is attracting a lot of interest as one of the most promising 4$^{th}$ Generation mobile communication technologies. In order to meet the increasing traffic demand, the LTE system adopts various technologies including carrier aggregation. Carrier aggregation is enabling to one or more secondary carriers along with one primary carrier, unlike the conventional system using one carrier for communication between a User Equipment (UE) and an evolved Node B (eNB), to increase the data rate in proportion to the number of secondary carriers. In LTE, the primary carrier is referred to as Primary Cell (PCell) and the secondary carrier as Secondary Cell (SCell).

Meanwhile, in the case of transmitting data in PCell and SCell simultaneously, this brings some problems such as how to perform Random Access (RA) and Sounding Reference Signal (SRS) transmission and how to determine transmission power.

Particularly in the case of the Carrier Aggregation (CA) between PCell operating in Time Division Duplex (TDD) and TDD SCell or between TDD SCells, it may occur that downlink and uplink reception and transmission have to be performed simultaneously depending on the TDD configuration, and this functionality may not be supported depending on the UE capability.

Furthermore, in the case that there is any change in the positions of the eNB devices managing the PCell and SCell due to the deployment of repeaters and Remote Radio Heads (RRHs), the uplink transmission timing may vary and thus it is necessary to measure downlink reference signal and report the measurement result. There is therefore a need of specifying detailed operations to solve the above problems.

DISCLOSURE OF INVENTION

Technical Problem

The present invention has been conceived to solve this problem and aims to provide a detailed operation method of the UE in various situations occurring with the improved carrier aggregation technology in a wireless communication system.

Solution to Problem

In accordance with the first embodiment of the present invention, a Power Headroom Report (PHR) transmission method of a terminal in a wireless communication system using carrier aggregation technology includes receiving a PHR trigger message from a primary cell in a random access procedure to at least one secondary cell, configuring PHR to the secondary cell with which the random access has completed, and transmitting the PHR to the primary cell.

In accordance with another aspect of the present invention, a Power Headroom Report (PHR) reception method of a base station in a wireless communication system using a carrier aggregation technology includes transmitting a PHR trigger message to a terminal in random access procedure with at least one secondary cell and receiving a PHR configured for the secondary cell in which the random access has completed from the terminal.

In accordance with the second embodiment of the present invention, when the TDD configurations support inter-cell carrier aggregation, the terminal performs downlink reception only when no uplink transmission occurs in all serving cells.

In accordance with the third embodiment of the present invention, when a secondary cell is added for the terminal using carrier aggregation, the terminal transmit DL timing difference information between previous cell and secondary cell to be added. The base station is capable of designating the TAG including the cell having closest timing based on this.

In accordance with the fourth embodiment of the present invention, when the pathloss becomes worse than a predetermined threshold in transmitting SRS to SCell, the terminal stops transmitting SRS.

Advantageous Effects of Invention

The method proposed in the present invention is capable of using the improved carrier aggregation technology for communication with malfunctioning.

MODE FOR THE INVENTION

Figure 1:
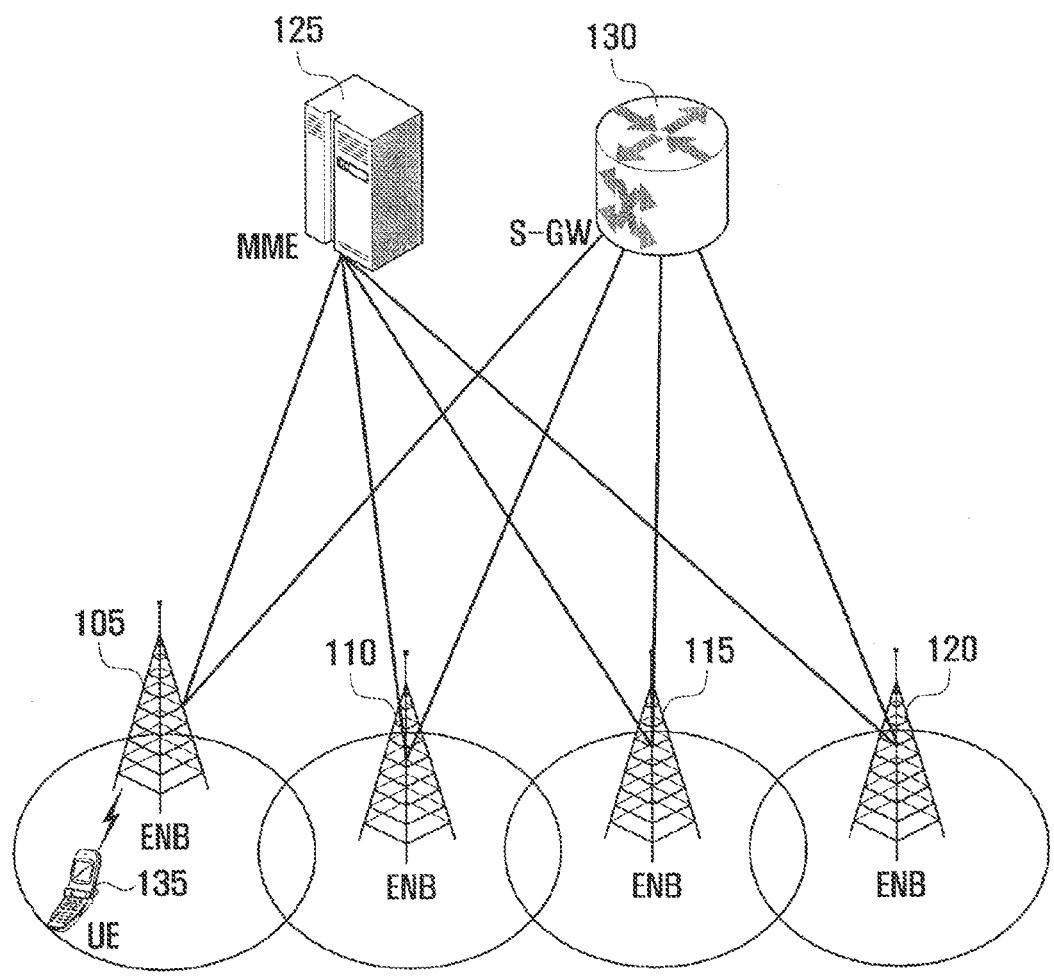
FIG. 1 is a diagram illustrating the LTE system architecture to which the present invention is applied.

Detailed description of well-known functions and structures incorporated herein may be omitted to avoid obscuring the subject matter of the present invention.

The first embodiment of the present invention proposes the operation method of a UE in random access procedure.

Apply preamble limit indicated by an RRC message to RA in SCell.

Determine Power Headroom (PH) in transmitting Power Headroom Report (PHR) and configured maximum UE output power ($P_{CMAX}$) value depending on whether UE has transmitted a preamble or msg 3 when PHR triggered.

When Power Headroom Report (PHR) is triggered, trigger PHR and report PH only for Timing Advance Timer (TA Timer) in connected state The second embodiment of the present invention proposes the operation method of a UE when a plurality of TDD serving cells is configured.

In case that serving cells operate in same TDD configuration, perform DL/UL operations as configured In case that serving cells operate in different TDD configurations and UE supports simultaneous bidirectional communication, perform DL/UL operations as configured In case that serving cells operate in different TDD configurations and UE does not support simultaneous bidirectional communication, abide by following rules If the subframe combination includes D subframe and D subframe in all serving cells, perform downlink reception If the subframe combination includes S subframe and S subframe in all serving cells, skip downlink reception If the subframe combination includes S subframe, D subframe and D subframe, U subframe and U subframe, and S subframe in all serving cells, determine whether to perform downlink reception according to the following rules.

If uplink transmission is occurring at least one of the serving cells, skip downlink reception. If there is no uplink transmission in all serving cells, perform downlink reception.

The third embodiment of the present invention proposes the operation method of a UE for reporting downlink reception timing difference. When an eNB configures a certain SCell to a certain UE, it checks the serving cell of which reception timing is closest to the downlink reception timing of the SCell among the serving cells configured to the UE already to sort the SCell into an appropriate TAG.

(for the purpose of configuring Timing Advance Group (TAG)), the UE reports the cell having the least DL timing difference with a predetermined cell among the serving cell configured currently The fourth embodiment of the present invention proposes the operation method of a UE for transmitting SRS in SCell. The SRS transmission power is in proportion to the size of the pathloss of the corresponding SCell. If the channel quality of the SCell degrades abruptly, the SRS transmission of the UE in the corresponding cell gives no gain but causes significant interference to the neighbor cells or nearby UEs. Accordingly, the present invention proposes a method for the UE transmitting SRS in a SCell to stop SRS transmission when the pathloss becomes worse than a predetermined threshold.

A description is made of an embodiment of the present invention with reference to accompanying drawings hereinafter.

FIG. 1 is a diagram illustrating the LTE system architecture to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME is responsible for various control functions and connected to a plurality of eNBs.

Figure 2:
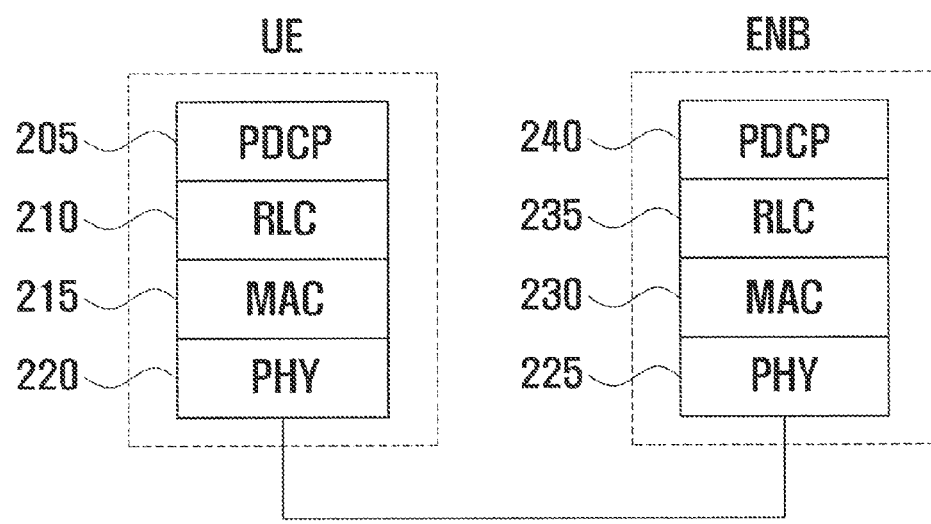
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size. The MAC 215 and 230 is responsible for establishing connection to a plurality of RLC entities so as to multiplex the RLC PDUs into MAC PDUs and demultiplex the MAC PDUs into RLC PDUs. The PHY layer 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel (PHICH), and the uplink HARQ ACK/NACK corresponding to downlink transmission is carried by Physical Uplink Control Channel (PUCCH) or Physical Uplink Shared Channel (PUSCH).

Figure 3:
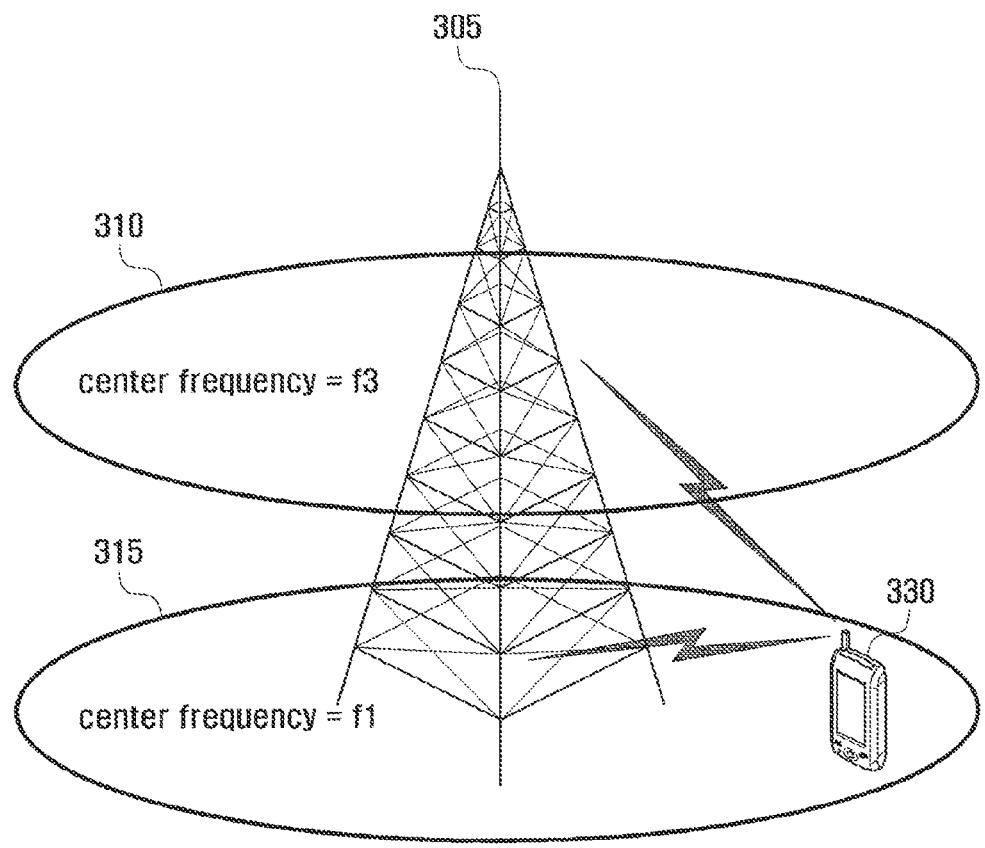
FIG. 3 is a diagram for explaining carrier aggregation of the UE.

FIG. 3 is a diagram for explaining carrier aggregation of the UE.

Referring to FIG. 3, an eNB transmits and receives signals through multiple carriers across a plurality of frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE 330.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, the phrase "a UE receives data through a certain downlink carrier or transmits data through a certain uplink carrier" means to receive or transmit data through control and data channels provided in cells corresponding to center frequencies and frequency bands characterizing the carriers. Although the description is directed to an LTE system for convenience of explanation, the present invention can be applied to other types of wireless communication systems supporting carrier aggregation.

Figure 4:
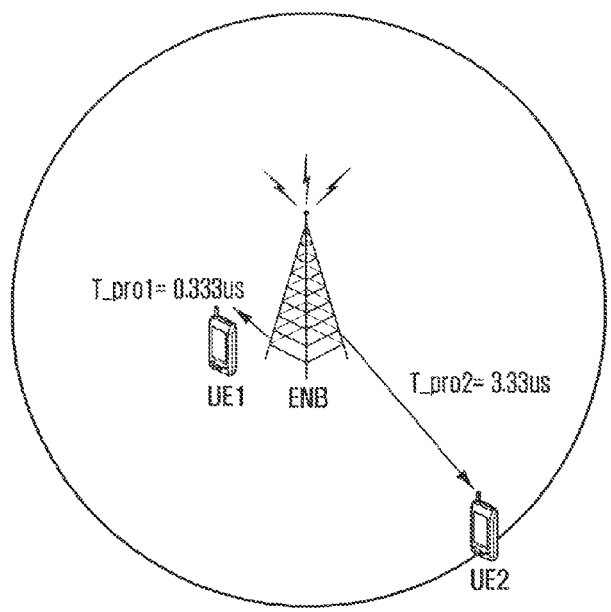
FIG. 4 is a diagram illustrating the necessity and role of uplink timing synchronization procedure in OFDM-based 3GPP LTE system.
Figure 4:
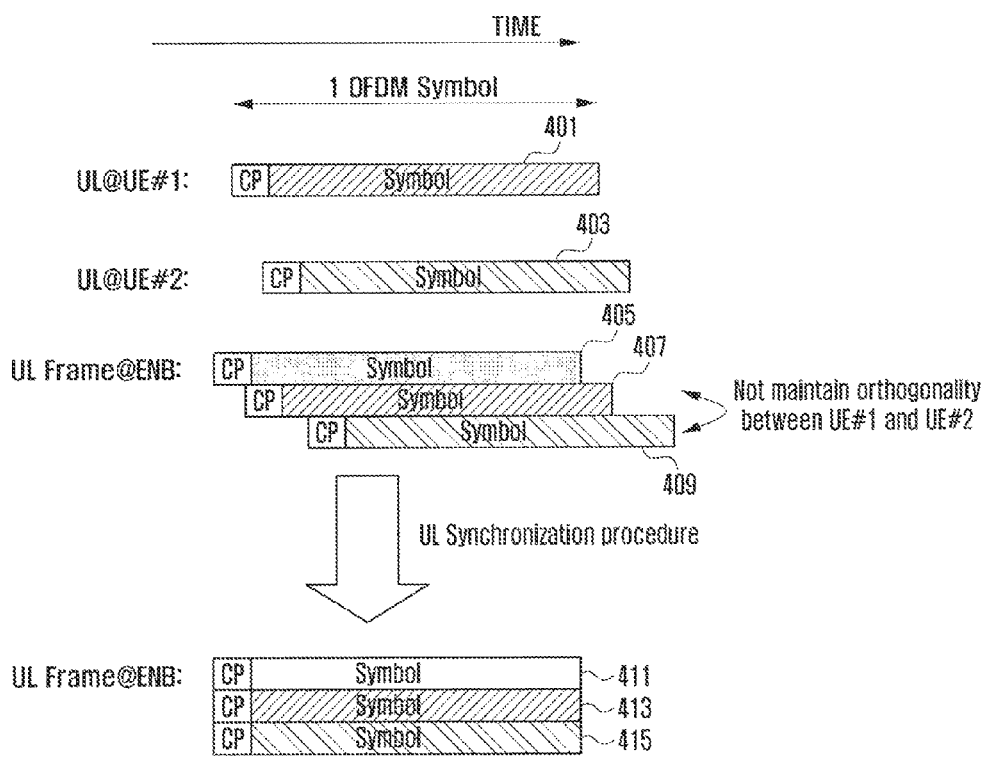

FIG. 4 is a diagram illustrating the necessity and role of uplink timing synchronization procedure in OFDM-based 3GPP LTE system.

The UE1 is located near the eNB and the UE2 is located far from the eNB. T_pro1 denotes the first propagation delay time to the UE1, and T_pro2 denotes the second propagation delay to the UE2. As shown in FIG. 4, the UE1 locates near the eNB as compared to the UE2 and thus has a relatively short propagation delay (in FIG. 4, T_pro1 is 0.333 us, and T_pro2 is 3.33 us).

In a cell of the eNB of FIG. 4, when the UE 1 and UE 2 power on or are operating in idle mode, there is a problem of synchronization mismatch among the uplink timings of the UE 1 and UE 2 and other UEs detected by the eNB within the cell.

Reference number 401 denotes uplink OFDM symbol transmission timing of the UE1, and reference number 403 denotes uplink OFDM symbol transmission timing of the UE2. By taking notice of the uplink transmission propagation delays of the UE1 and UE2, the eNB may receive the uplink OFDM symbols at the timings as denoted by reference numbers 405, 407, and 409. That is, the UE1's uplink symbol is received by the eNB at the timing 407 with a short propagation delay while the UE2's uplink symbol transmitted is received by the eNB at the timing 409 with relatively long propagation delay. Since the timings 407 and 409 precede the synchronization between the uplink transmission timings of the UE1 and UE2, the uplink OFDM symbol reception and decoding start timing 405 of the eNB, the UE1's uplink OFDM symbol reception timing 407, and the UE2's uplink OFDM symbol reception timing 409 are different among each other.

In this case, the uplink symbols transmitted by the UE1 and UE2 are not orthogonal so as to interfere to each other and, as a consequence, the eNB is likely to fail decoding the uplink symbols transmitted, at the timing 401 and 403, by the UE1 and UE2 due to the interference and the mismatch between the uplink symbol reception timings 407 and 409.

Uplink timing synchronization is a procedure for acquiring the eNB's uplink symbol reception timings with the UE1 and UE2 and, if the uplink timing synchronization procedure completes, the eNB receives uplink OFDM symbol to acquire decoding start timing as denoted by reference numbers 411, 413, and 415.

In the uplink timing synchronization procedure, the eNB transmits Timing Advance (hereinafter, referred to as TA) information to the UEs to notify of the timing adjustment amount.

The TA information may be transmitted in the Random Access Response (RAR) message in response to the random access preamble transmitted by the UE for initial access or in the Timing Advance Commence MAC Control Element (TAC MAC CE). The UE is capable of adjusting the uplink transmission timing based on the TA information.

The UE which has received the TA information starts a time alignment timer (timeAlignmentTimer, TAT). The TAT is the timer indicating whether the TA is valid. That is, the TA is valid in the TAT duration but its validity is not guaranteed after the expiry of the TAT.

If the TA information is received again afterward, the UE restarts the TAT and, if the TAT expires, it determines that the TA information is not valid any long and thus stops uplink transmission to the eNB.

By synchronizing the timings as described above, the symbols transmitted by the UE1 and UE2 maintain orthogonality such that the eNB is capable of decoding the uplink symbols 401 and 403 transmitted by UE1 and UE2 successfully.

Figure 5:
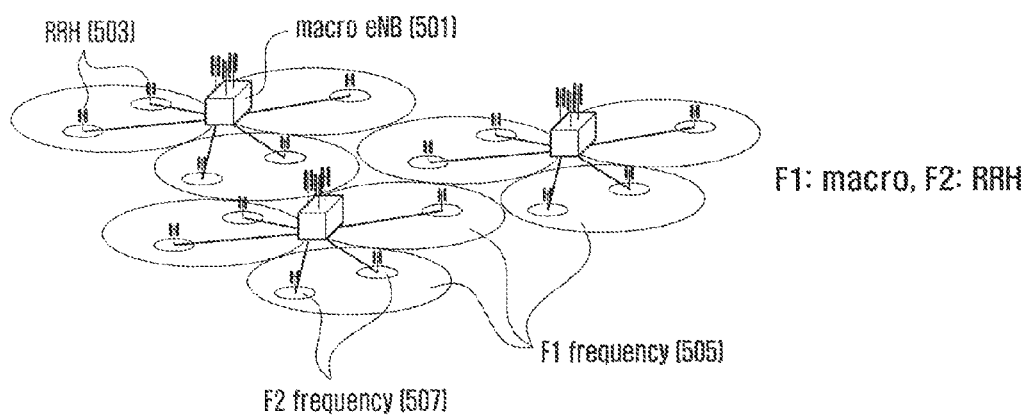
FIG. 5 is a diagram for explaining a case where the devices using the primary and second carriers are located at different positions in the carrier aggregation system.

FIG. 5 is a diagram for explaining a case where the devices using the primary and second carriers are located at different positions in the carrier aggregation system.

In FIG. 5, the Remote Radio Heads (RRHs) 503 using the frequency band F2 507 are deployed around the macro eNB 501 using the frequency band F1 505. If the UE uses the macro eNB and the RRH simultaneously at a position near the RRH, although it transmits a signal to the RRH with a certain delay, the signal may arrives at an appropriate timing due to the short distance. In contrast, in order for the signal to arrive at the macro eNB at an appropriate timing, the UE has to transmit the signal a little earlier due to the long distance. That is, when the UE operates in carrier aggregation mode, it is necessary to synchronize the plural uplink timings. There is therefore a need of a method for operating TATs for the uplink timings.

In an embodiment of the present invention, the eNB sorts the carriers having the same or similar uplink timings into a group for facilitating management. This is referred to as Timing Advance Group (TAG).

For example, if there are one PCell (or primary cell) and three SCells (or secondary cell) A, B, and C and if the PCell and SCell A have similar uplink timings, the PCell and SCell A is sorted into group 1 and SCells B and C into group 2 for facilitating management. If the eNB commands uplink timing adjustment for group 1 by transmitting TA information through TAC MAC CE or RAR, the UE adjusts uplink timings of the PCell and SCell A based on the information included in the TAC MAC CE. The UE also starts TAT for group 1 upon receipt of the TA information. The TAT is the timer indicating validity of the TA information such that the uplink data transmission on the carriers belonging to the group 1 (i.e. PCell and SCell A) is possible only when the TAT of the group 1 is running. If the TAT expires, the TA information becomes invalid and thus the UE cannot transmit data on the corresponding carrier until new TA information is received form the eNB. The TAT of the group including the PCell such as group 1, i.e. P-TAG, is referred to as P-TAG TAT, and the TAT of the group including no PCell such as group 2 is referred to as S-TAG TAT.

LTE standard supports two types of duplex modes including Frequency Division Duplex (FDD) and Time Division Duplex (TDD). FDD operates on two frequency bands for separate uplink and downlink, and TDD operates with on one frequency band for uplink and downlink. Accordingly, the transmission alternates between uplink and downlink subframes in TDD. The UE has to know the uplink and downlink subframes accurately, and the UE provides the UE with the subframe information in advance. The information on the uplink and downlink subframes is referred to as TDD configuration, and the eNB notifies the UE of one of total 7 TDD configurations as shown in table 1. According to the TDD configuration, each subframe is sorted into one of uplink subframe, downlink subframe, and special subframe. In table 1, D represents downlink subframe for downlink data transmission, and U represents uplink subframe for uplink data transmission. The special subframe is the subframe between consecutive downlink and uplink subframes. The reason for interposing the special subframe is because the timing of receiving the downlink subframe completely and the timing of transmitting uplink data vary depending on the location of the UE. For example, the UE located far from the eNB receives data transmitted by the eNB relatively lately. In this case, in order for the eNB to receive data transmitted by the UE in a predetermined time, the UE has to transmit data at a timer earlier. Meanwhile, there is no need of the special subframe between consecutive uplink and downlink subframe.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 6:
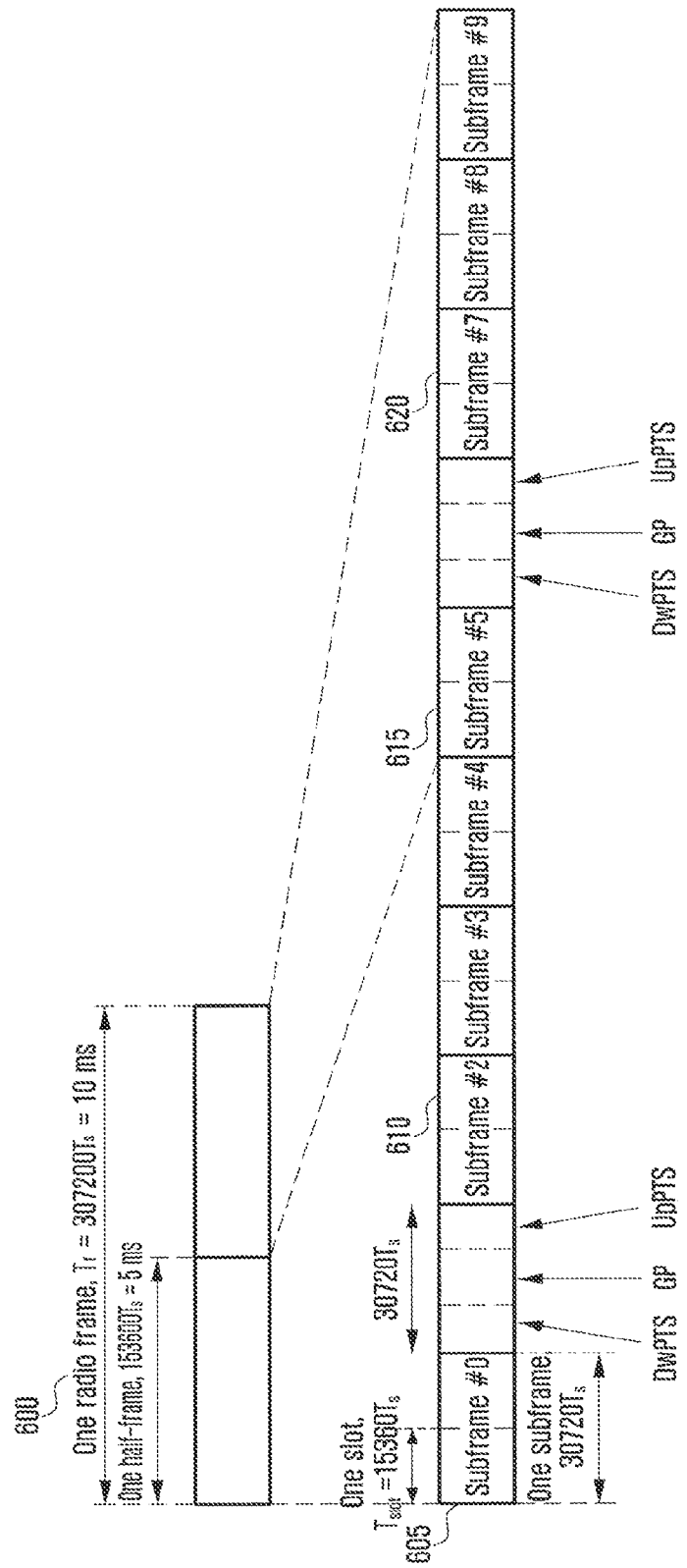
FIG. 6 is a diagram illustrating the TDD frame structure.

FIG. 6 is a diagram illustrating the TDD frame structure. The radio frame 600 spans 10 ms and consists of 10 subframes. Each subframe spans 1 ms and consists of two slots. In FIG. 6, the subframes 605 and 615 are downlink subframes, and the subframes 610 and 635 are uplink subframes, i.e. one of TDD configurations 0, 1, 2, and 6 is used. Accordingly, the subframe between two consecutive downlink and uplink subframes is the special subframe. The special subframe comprises three regions represented by Downlink Pilot TimeSlot (DwPTS) 620, Guard Period (GP) 625, and Uplink Pilot TimeSlot (UpPTS) 630. There is not data transmission in GP. The optimal DwPTS and UpPTS value may be determined depending on the radio environment. Accordingly, the eNB has to notify the UE of appropriate DwPTS and UpPTS values as exemplified in table 2. The TDD configuration in table 1 and DwPTS and UpPTS values in table 2 are delivered to the UE in IE Tdd-Config of SystemInformationBlock-Type1 (SIB1) broadcast by the eNB.

TABLE 2

Configuration of special subframe [lengths of DwPTS/GP/UpPTS]

| | Normal cyclic prefix in downlink | | | | | |
|---|---|---|---|---|---|---|
| | | UpPTS | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | | |

TABLE 2-continued

Configuration of special subframe [lengths of DwPTS/GP/UpPTS]

Normal cyclic prefix in downlink

| Special subframe configuration | DwPTS | UpPTS Normal cyclic prefix in uplink | UpPTS Extended cyclic prefix in uplink | DwPTS | Normal cyclic prefix in uplink | Extended cyclic prefix in uplink |
|---|---|---|---|---|---|---|
| 5 | $6592 \cdot T_S$ | $4384 \cdot T_S$ | $5120 \cdot T_S$ | $20480 \cdot T_S$ | $4384 \cdot T_S$ | $5120 \cdot T_S$ |
| 6 | $19760 \cdot T_S$ | | | $23040 \cdot T_S$ | | |
| 7 | $21952 \cdot T_S$ | | | | | |
| 8 | $24144 \cdot T_S$ | | | | | |

Figure 7:
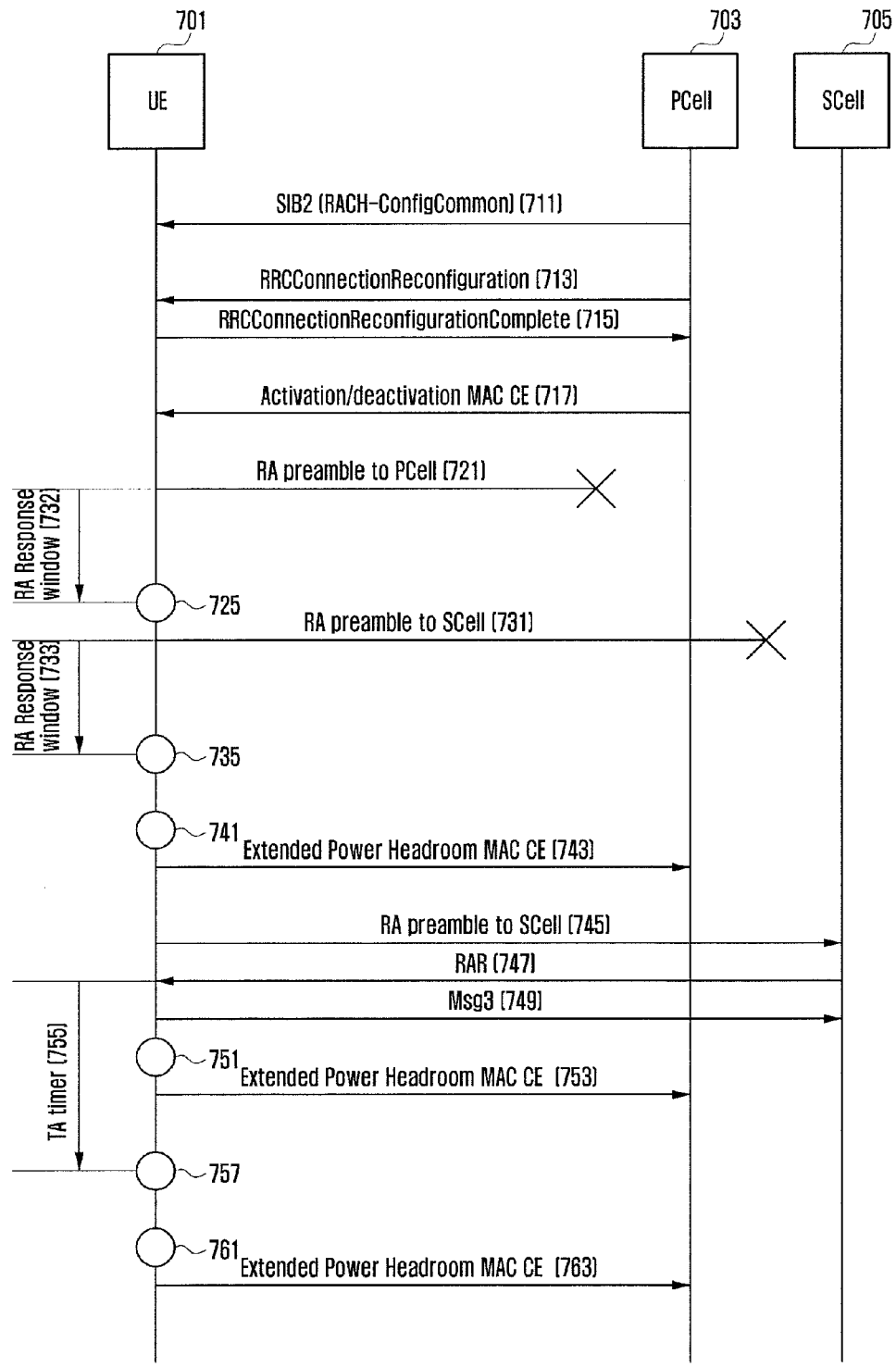
FIG. 7 is a signal flow diagram illustrating UE operation proposed for use with the improved carrier aggregation technology according to the first embodiment of the present invention.

FIG. 7 is a signal flow diagram illustrating UE operation proposed for use with the improved carrier aggregation technology according to the first embodiment of the present invention.

In FIG. 7, the UE 701 receives various parameter values for use in random access procedure using Random Access Channel (RACH) through System Information Block (SIB) at step 711. The parameters include maximum number of times of transmitting random access preamble (preambleTransMax), duration for receiving response message after the transmission of the random access preamble (ra-ResponseWindowSize), etc.

The PCell configures a SCell 705 to the UE additionally at step 713. At this time, RRCConnectionReconfiguration message may be used. The RRCConnectionReconfiguration message may include the parameters for use in random access. These parameters include maximum number of times of transmitting random access preamble (preambleTransMax), duration for receiving response message after the transmission of the random access preamble (ra-ResponseWindowSize), etc.

Afterward, the PCell 703 sends the UE an activation command for activating the configure SCell 705 at step 717.

In the case that the UE performs random access in the PCell, it transmits the random access preamble through RACH of the PCell at step 721. If the transmission fails, i.e. if no Random Access Response (RAR) is received in the RA Response window 723 after the transmission of the random access preamble, the UE determines whether to perform retransmission by checking whether the number of times of transmitting the preamble has reached preambleTransMax value at step 725. In the case that the UE performs random access in the SCell, it transmits the random access preamble through the RACH of the SCell at step 731. If the transmission fails, i.e. if no Random Access Response (RAR) is received in the RA Response window 733 after the transmission of the random access preamble, the UE determines whether to perform retransmission by checking whether the number of times of transmitting the preamble has reached preambleTransMax value at step 735.

Meanwhile, Power Headroom Report (PHR) may be triggered in the state that the random access preamble transmission to the SCell has not succeeded yet but is in progress at step 741. PHR is triggered in the following cases.

When prohibitPHR-Timer has expired or when prohibitPHR-Timer timer has expired and pathloss has changed more than dl-PathlossChange dB When periodicPHR-Timer has expired When higher layer has configured/reconfigured PHR function When uplink-configured SCell has been activated prohibitPHR-Timer, dl-PathlossChange, and periodicPHR-Timer may be configured through RRCConnectionReconfiguration message 713.

The PHR includes the following information per SCell configured.

Power Headroom Level (PH): information on the difference between the configured maximum UE output power ($P_{CMAX,c}$) in serving cell c and the measured power on Uplink Shared Channel (UL-SCH) per serving cell c $P_{CMAX,c}$: configured maximum UE output power in serving cell c The PCMAX,c has a value in the range of $P_{CMAX\_L,c} \leq P_{CMAX,c} \leq P_{CMAX\_H,c}$ and expressed by $P_{CMAX\_L,c} = \text{MIN}\{P_{EMAX,c} - \Delta T_{C,c}, P_{PowerClass} - \text{MAX}(MPR_c + A-MPR_c, P-MPR_c) - \Delta T_{C,c}\}$, for intra-band CA $$P_{CMAX\_L,c} = \text{MIN}\{P_{EMAX,c} - \Delta T_{C,c}, P_{PowerClass} - \text{MAX}(MPR_c + A-MPR_c, P-MPR_c) - \Delta T_{C,c}\},$$

and $$P_{CMAX\_L,c} = \text{MIN}\{P_{EMAX,c} - \Delta T_{C,c}, P_{PowerClass} - \text{MAX}(MPR_c + A-MPR_c + \Delta T_{IB,c}, P-MPR_c) - \Delta T_{C,c}\}$$

for inter-band CA.

$$P_{CMAX\_H,c} = \text{MIN}\{P_{EMAX,c}, P_{PowerClass}\}$$

$P_{EMAX,c}$ denotes eNB-allowed maximum UE output power $\Delta T_{C,c}$ denotes power for mitigating adjacent frequency interference when the transmission band is outside of the band $P_{PowerClass}$ denotes maximum UE-available transmit power Maximum Power Reduction ($MPR_c$) denotes power reduction when using high modulation order and broad bandwidth Additional-MPR$_c$ (A-MPR$_c$) denotes power that should be considered in addition to MPRC P-MPR$_c$ denotes value in consideration of power management of serving cell $\Delta T_{IB,c}$ denotes power that should be considered additionally by taking notice of inter-band CA For the case that the random access has not succeed yet like the above scenario when the UE transmits the PHR, the present invention proposes reporting $P_{CMAX,c}$ determined using the value with the exception of $\Delta T_{IB,c}$ even in using the inter-band CA. That is, the proposal is to report the PCMAX,c determined based on the value used in the intra-band CA at step 743. This is because, since the eNB may not know that the UE is transmitting the preamble in the SCell due to the incompletion of the random access of the UE yet in the corresponding cell, the UE may determine as if the $P_{CMAX,c}$ reported by the UE is the $P_{CMAX,c}$ which has been determined at the state without uplink transmission on other band.

Afterward, the UE transmits the preamble successfully in the SCell at step 745, receives the Random Access Response (RAR) at step 747, and transmits msg 3 at step 749.

After transmitting the normal message such as msg 3, PHR is triggered at step 751 and, in the case that the inter-band CA is used in transmitting PHR in the same way as the legacy method, the UE reports $P_{CMAX,c}$ determined in consideration of $\Delta T_{IB,c}$ at step 753.

In the above procedure, since the random access has not succeeded yet although the TAG configuration for the SCell is performed at steps 713 and 715, the TA timer of the corresponding SCell has not start yet at step 743. After the receipt of RAR at step 747, if the TA timer 755 for the SCell expires at step 757, it is impossible to transmit data to the SCell. Since the uplink data transmission to the cell for which the TA is not running and SCell is not activated is impossible, there is no need of triggering PHR and reporting PHR in consideration of the SCells in reporting PHR to another cell. Accordingly, the present invention proposes triggering PHR only for the serving cell belonging to the TAG for which TA timer is running and activated currently and, when PHR is triggered, reporting HR for only the serving cells belonging to the TAG for which the TA timer is running and activated currently.

When the PHR is triggered at steps 741, 751, and 761, any value for the corresponding SCell is not transmitted at steps 743 and 763 but the PH and PCMAX,c values for the corresponding SCell are reported at step 753 where the SCell is activated and the corresponding TA timer is running.

Figure 8:
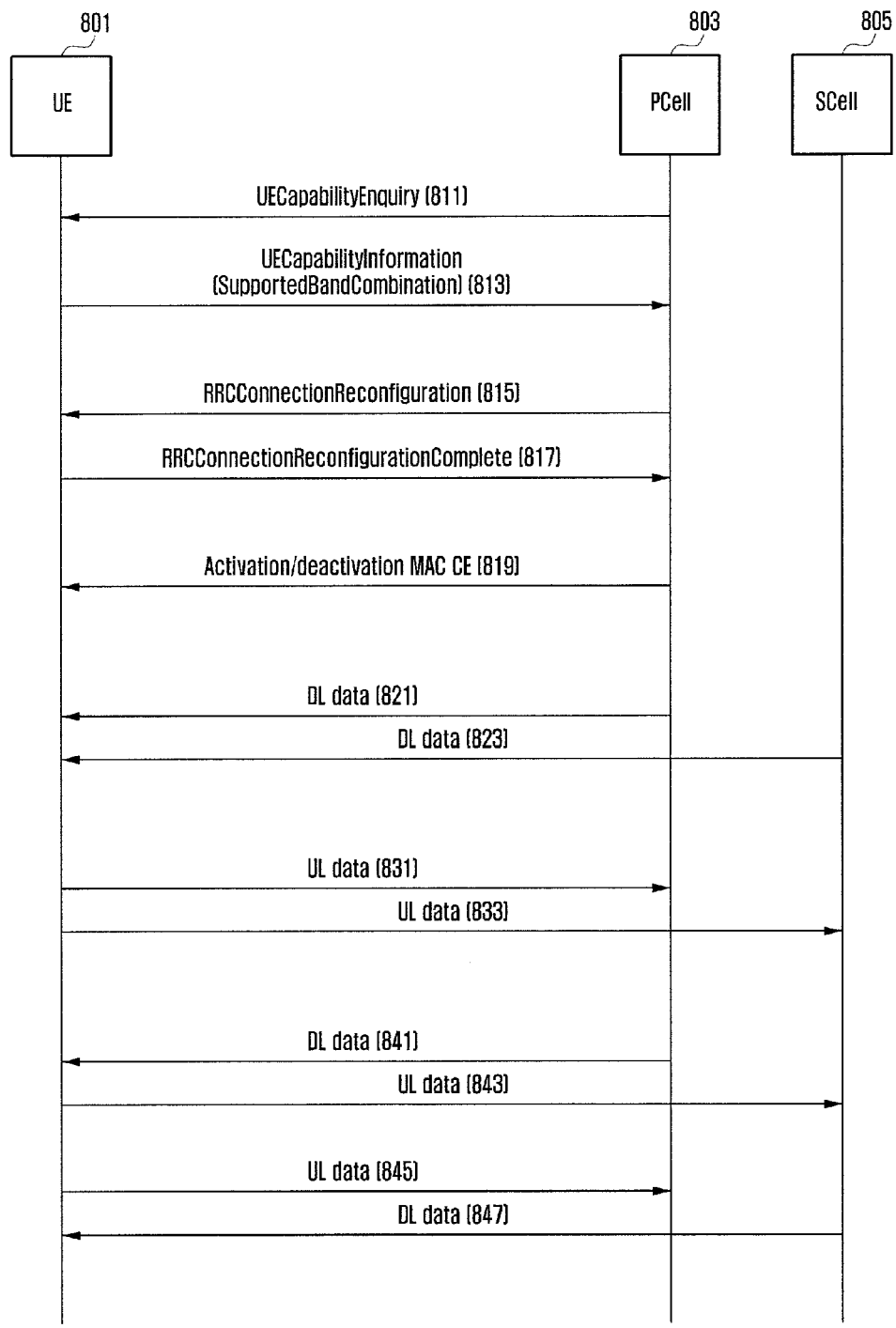
FIG. 8 is a signal flow diagram illustrating UE operation proposed for use with the improved carrier aggregation technology according to the second embodiment of the present invention.

FIG. 8 is a signal flow diagram illustrating UE operation proposed for use with the improved carrier aggregation technology according to the second embodiment of the present invention.

FIG. 8 assumes the scenario in which the UE 801 configures CA to the PCell 803 and SCells 805 having different TDD configuration values. The UE is in the state connected to the PCell.

In order to check the UE capability, the PCell sends the UE UECapabilityEnquiry message at step 811. Upon receipt of this message, the UE sends the PCell the UECapabilityInformation message indicating its capability at step 813. If it supports CA, the UE may notify of supporting CA with combination of a plurality of bands and, in this embodiment, the simultaneous bidirectional transmission capability per band combination supported by the UE is reported using 1 bit information. If the 1-bit informations are reported in the form of a bitmap, the individual bits of the bitmap correspond to the inter-frequency band combinations in the order as contained. If this information is received, the eNB is aware whether the UE supports simultaneous bidirectional transmission. The eNB includes the information on the frequency band combinations it supports in the supportedBandCombination IE. In more detail, this is the information indicating the frequency combinations with which the UE supports carrier aggregation and a set of informations including frequency band and number of serving cells (hereinafter, band combination information). For example, the UE reports the information representing {[frequency band=x, number of serving cells=2]} for the case of supporting two serving cell on the frequency band x and the information representing {[frequency band=x, number of serving cells=1], [frequency band=y, number of serving cells=1]} for the case of supporting 1 serving cell on the frequency band x and 1 serving cell on the frequency band y. the UE may support several frequency band combinations and thus a plurality of band combination information may be included in the supported BandCombination.

In the present invention, the simultaneous bidirectional transmission supportability is indicated with a bitmap according to the order of band combination informations contained in the supportedBandCombination. At this time, the number of band combination informations reported with the bitmap may be restricted as follows.

Include band combination informations remained after excluding the FDD band-only band combination informations and intra-band band combination information (e.g. two serving cells on band x) in the bit map.

Accordingly, the UE checks the band combination information fulfilling the condition and indicates the simultaneous bidirectional transmission supportability using 1 bit according to the order as the band combination informations are contained in the supportedBandCombination.

The exemplified drawing is directed to the case where the UE supports inter-band CA between PCell and SCell but does not support simultaneous bidirectional transmission.

Afterward, the PCell sends the UE a message for configuring a plurality of TDD serving cells at step 815. For this purpose, the RRCConnectionReconfiguration message is used. If this message is received, the UE acknowledges by transmitting RRCConnectionReconfigurationComplete message at step 817. The UE also sends the activation command for the configured SCell 805 at step 819. This command is transmitted in Activation/deactivation MAC CE.

Afterward, the UE checks whether the subframe of each serving cell is D subframe or U subframe to determine whether to monitor the downlink control channel during a predetermined time period. For example, if all the subframes of all serving cells are D subframes at steps 821 and 823, the UE monitors the downlink control channel independently of simultaneous bidirectional transmission supportability. If the subframes of all serving cells are U subframes at step 831 and 833, the UE does not monitor the downlink control channel independently of simultaneous bidirectional transmission supportability. Or, although the subframes of some serving cells are D subframes or S subframes, if the serving cells are not scheduled cells, the UE does not monitor the downlink control channel. If a certain serving cell is not the scheduled serving cell, this means the downlink assignment or uplink grant for the serving cell is configured to be transmitted through another serving cell. That is, this means that the cross carrier scheduling has been configured for the corresponding cell.

However, the subframes may be of different TDD configurations. For example, configurations 0 and 1 of table 1 are combined in CA, the types of subframes match at subframes 0, 1, 2, 3, 5, 6, 7, and 8 (i.e. D, S or U in both configurations) but mismatch at subframes 4 and 9 (i.e. D in one and S in the other configuration). At this time, assuming that if the UE supports simultaneous bidirectional transmission at step 813, it is possible receive the downlink subframes at step 841 and 847 and transmit the uplink subframes at step 843 and 845 simultaneously as aligned in the respective configurations.

However, if the UE does not support the simultaneous bidirectional transmission as assumed in this drawing, one predetermined operation (i.e. transmission or reception) is performed at the subframe where UL and DL collide. That is, the UE performs receiving DL subframe at steps 841 and 847 but gives up transmitting UL subframe at steps 841 and 845, or gives up receiving downlink subframe at steps 841 and 847 and performs transmitting uplink subframes at steps 843 and 845. At this time, the UE abides by the following rule.

In the case that D, U, and S subframes are coexistent at a certain subframe n appears, if uplink transmission is scheduled at the U subframe (e.g. if HARQ NACK or uplink assignment instructing initial transmission or retransmission has been received at subframe [n−4], if the serving cell of U subframe is PCell and CQI transmission is schedule at subframe n, or if SRS transmission is scheduled at subframe n), the UE does not receive downlink control channel at subframe n. If no uplink transmission is scheduled at the u subframe, the UE receives the downlink control channel at D subframe or S subframe of the scheduled cell.

In summary, the UE operation of embodiment 2 includes the following steps.

Step at which the UE reports 1-bit information indicating simultaneous bidirectional transmission supportability per supported band combination.

Step at which the UE configure a plurality of TDD serving cells according to the instruction of the eNB.

Step of checking whether the TDD configurations of configured TDD serving cells match each other.

Step of performing downlink reception and uplink transmission in the serving cell as scheduled by the eNB, if match.

Step of determining whether it has reported that simultaneous bidirectional transmission for frequency band combinations of the configured serving cells is possible (or impossible), if mismatch.

Step of performing downlink reception and uplink transmission in the serving cell as scheduled by eNB, if possible.

Step of determining whether to perform downlink reception at a certain subframe, if impossible. The determination follows the following rule.

If the subframe is D subframe or S subframe for all serving cells, perform downlink reception.

If the subframe is U subframe for all serving cells, do not perform downlink reception.

If the subframe is S or D subframe for at least one serving cell and U subframe for at least one serving cell, determine whether to perform downlink reception according to the following rule.

If uplink transmission is scheduled at least one of the serving cells, do not perform downlink reception. If uplink transmission is not scheduled in any serving cell, perform uplink transmission.

Figure 9:
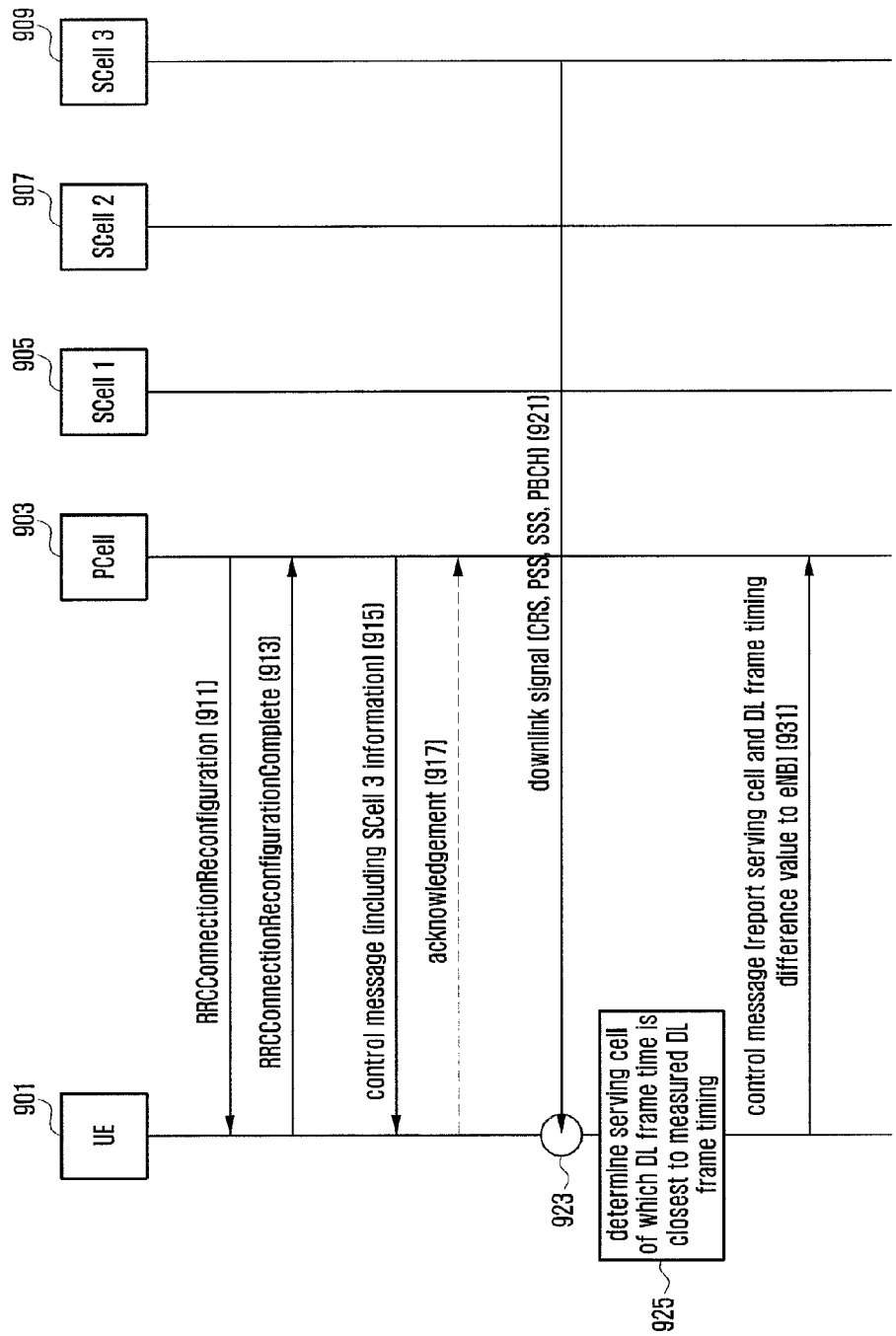
FIG. 9 is a signal flow diagram illustrating UE operation proposed for use with the improved carrier aggregation technology according to the third embodiment of the present invention.

FIG. 9 is a signal flow diagram illustrating UE operation proposed for use with the improved carrier aggregation technology according to the third embodiment of the present invention.

FIG. 9 assumes the scenario in which the UE 901 operates CA with several serving cells 903, 905, 907, and 909. For this purpose, the serving cell 903 operating as PCell sends the message configuring other cells as SCells at step 911. At this time, the RRCConnectionReconfiguration message is used. If this message is received, the UE sends the RRCConnectionReconfigurationComplete message to acknowledge the configuration successful a step 913.

Afterward, the eNB transmits a predetermined control message to command measuring the timing of the downlink frame reception timing in a specific cell (SCell 3 in this embodiment) at step 915. In reply, the UE transmits an acknowledgement message at step 917. The predetermined control message includes the information on the first cell (SCell 3 in this embodiment), and the UE measures the downlink frame timing of the cell indicated in the first cell information at step 923. The first cell information may include Physical Cell Identifier (PCI) or SCell ID and thus the UE measures Cell-specific Reference signal (CRS) and/or Primary Synchronization Signal (PSS) and/or Secondary Synchronization Signal (SSS) and/or Physical Broadcast Channel (PBCH) at step 921.

The UE measures the signals to check the serving cell having the downlink frame timing closest to the measured downlink frame timing at step 925. In the embodiment, one of the serving cells 903, 905, and 907 is selected.

Afterward, the UE reports the difference value between the downlink frame timings of the selected serving cell and the cell indicated in the first cell information to the eNB at step 931.

Figure 10:
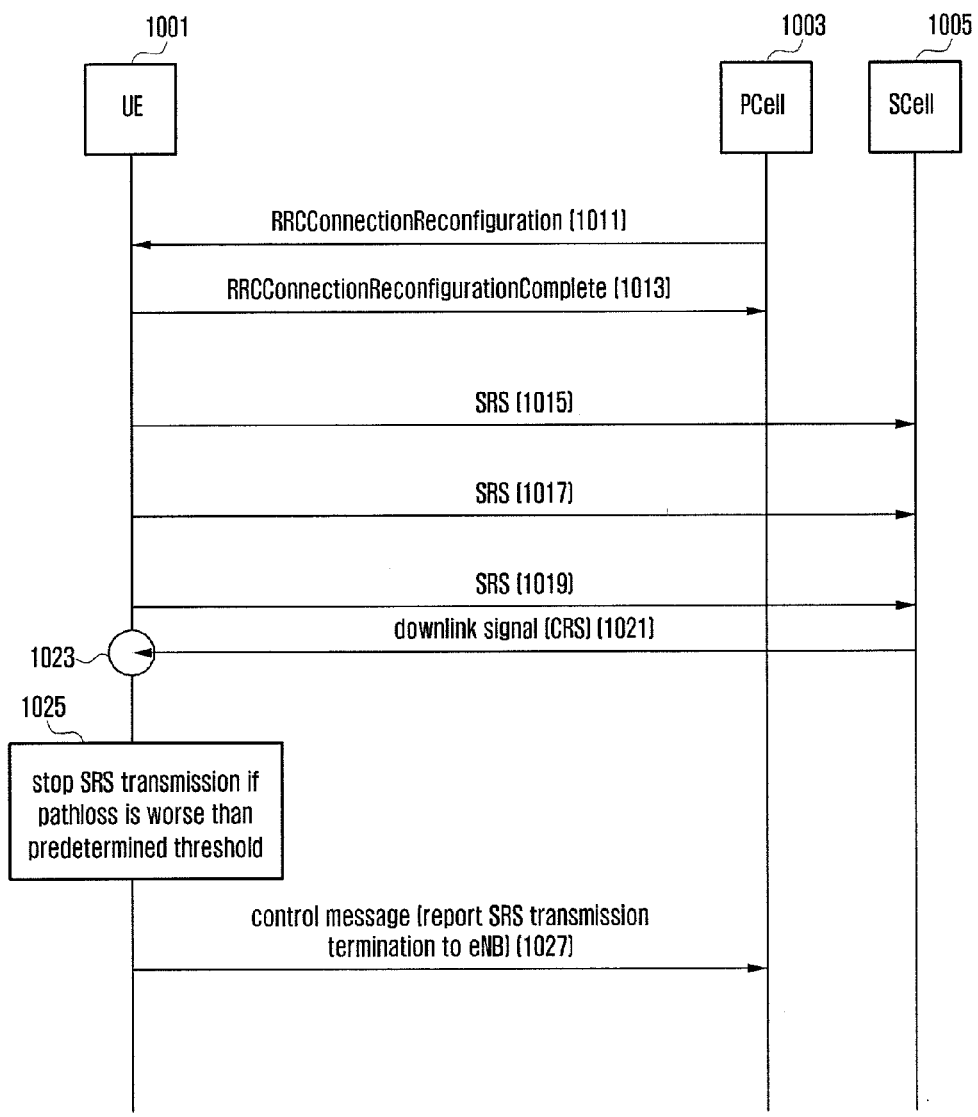
FIG. 10 is a signal flow diagram illustrating UE operation proposed for use with the improved carrier aggregation technology according to the fourth embodiment of the present invention.

FIG. 10 is a signal flow diagram illustrating UE operation proposed for use with the improved carrier aggregation technology according to the fourth embodiment of the present invention.

FIG. 10 assumes the scenario in which the UE operates CA with multiple serving cells 1003 and 1005. Also, it is assumed that the SCell 1005 is in the state configured already through the RRCConnectionReconfiguration message.

For downlink signal measurement in SCell, the eNB commands the UE to transmit SRS at a predetermined interval in a predetermined serving cell (cell 1005 in this embodiment) at step 1011. In reply, the UE sends an acknowledgement message at step 1013 and transmits SRS at the predetermined interval in the predetermined serving cell as commanded at step 1015, 1017, and 1019.

Meanwhile, the UE measures pathloss of the serving cell in which it transmits SRS constantly at step 1023. At this time, the pathloss can be measured based on the CRS at step 1021. If the pathloss of the serving cell becomes worse than a predetermined threshold while measuring the signal from the serving cell in which it is transmitting SRS, the UE stops SRS transmission at step 1025 and transmits a predetermined message to report the termination of SRS transmission to the eNB at step 1027.

Figure 11:
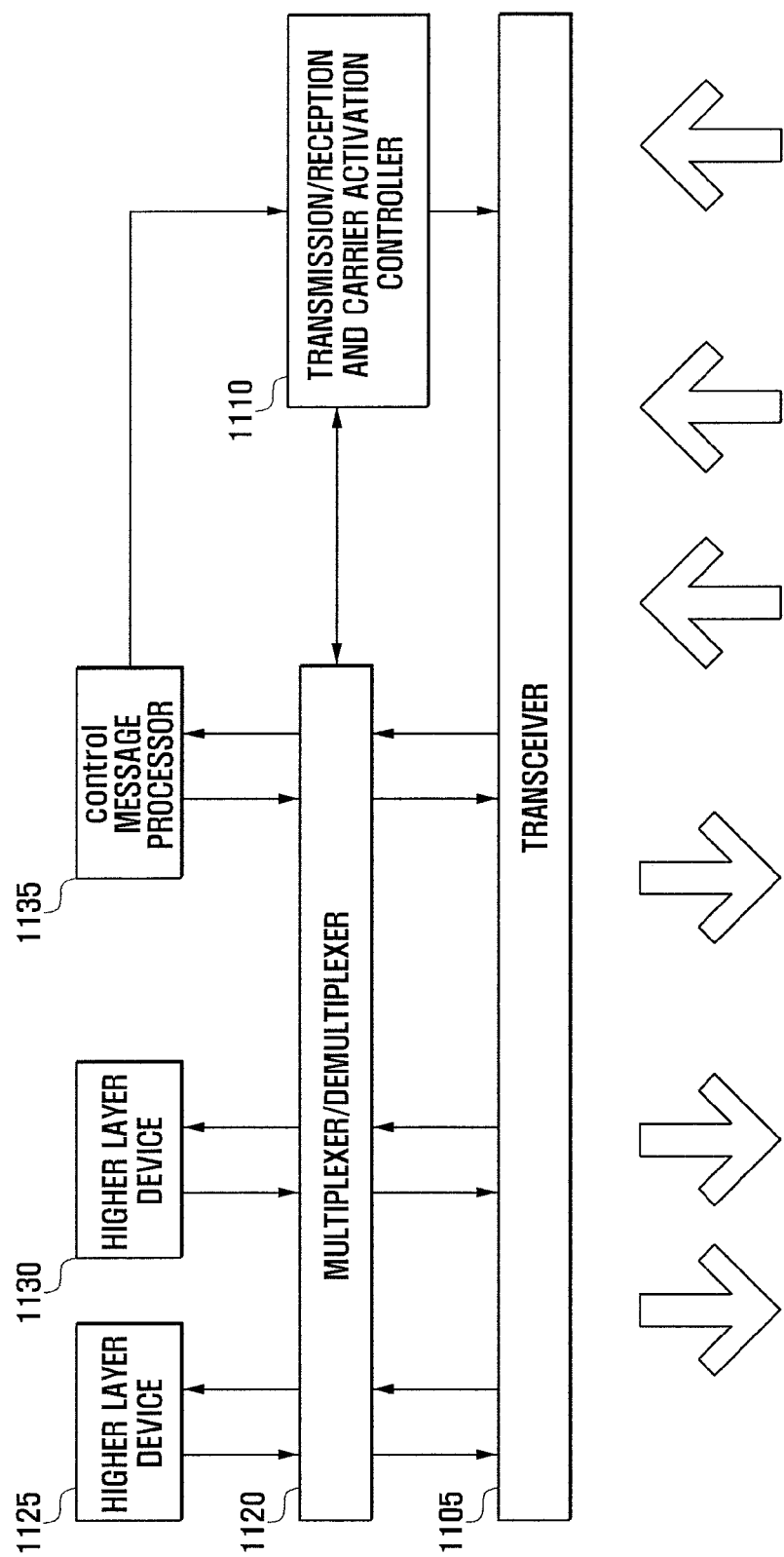
FIG. 11 is a block diagram illustrating a configuration of the UE according to an embodiment of the present invention.

FIG. 11 is a block diagram illustrating a configuration of the UE according to an embodiment of the present invention.

Referring to FIG. 11, the UE according to an embodiment of the present invention includes a transceiver 1105, a controller 1110, a multiplexer/demultiplexer 1120, a control message processor 1135, and various higher layer processors 1125 and 1130.

The transceiver 1105 receives data and predetermined control signals through downlink channel of the serving cell and transmits data and predetermined control signals through uplink channel. In the case that multiple serving cells are configured, the transceiver 1105 transmits and receives data and communication through the multiple serving cells.

The multiplexer/demultiplexer 1120 multiplexes the data generated by the higher layer processors 1125 and 1130 and the control message processor 1135 and demultiplexes the data received by the transceiver 1105 to deliver the demultiplexed data to the higher layer processors 1125 and 1130 or the control message processor 1135.

The control message processor 1135 processes the control message received from the eNB to take a necessary action. For example, if DRX parameters are received, it sends the parameters to the controller.

The higher layer processors 1125 and 1130 may be implemented per service and sends the data generated by the user service such as File Transfer Protocol (FTP) or Voice over Internet Protocol (VoIP) to the multiplexer/demultiplexer 1120 and processes the data from the multiplexer/demultiplexer 1120.

The controller 1110 checks the scheduling command, e.g. uplink grants, received by the transceiver 1105 and controls the transceiver 1105 and the multiplexer/demultiplexer 1120 to perform uplink transmission using appropriate transmission resource at an appropriate time. The controller controls the transceiver in association with DRX operation and CSI/SRS transmission.

Figure 12:
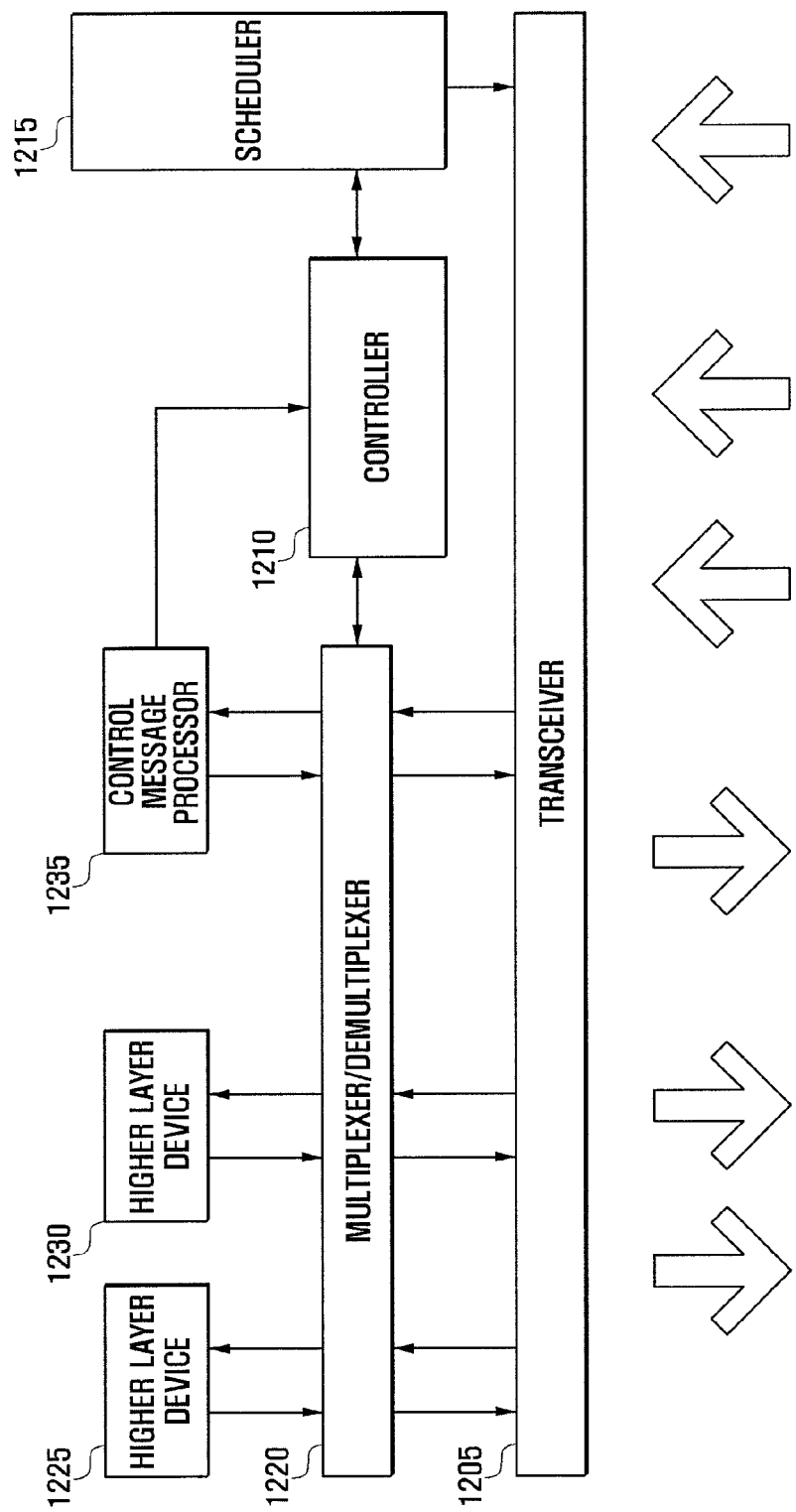
FIG. 12 is a block diagram illustrating a configuration of the eNB according to an embodiment of the present invention.

FIG. 12 is a block diagram illustrating a configuration of the eNB according to an embodiment of the present invention, and the eNB of FIG. 12 includes a transceiver 1209, a controller 1210, a multiplexer/demultiplexer 1220, a control message processor 1235, various higher layer processors 1225 and 1230, and a scheduler 1215.

The transceiver 1205 transmits data and predetermined control signals on the downlink carrier and receives data and predetermined control signals on the uplink carrier. If multiple carriers are configured, the transceiver 1205 transmits and receives the data and control signals on the multiple carriers.

The multiplexer/demultiplexer 1220 multiplexes the data generated by the higher layer processors 1225 and 1230 and the control message processor 1235 and demultiplexes the data from the transceiver 1205 to deliver the demultiplexed data to the appropriate higher layer processors 1225 and 1230, control message processor 1235, or the controller 1210. The control message processor 1235 processes the control message transmitted by the UE to take a necessary action and generates the control message to be transmitted to the UE to the higher layer.

The higher layer processors 1225 and 1230 are implemented per UE per service and processes the data generated by the user service such as FTP or VoIP and sends the processing result to the multiplexer/demultiplexer 1220 or processes the data from the multiplexer/demultiplexer 1220 and sends the processing result to the service application of the higher layer.

The controller 1210 controls the transceiver based on the CRS/SRS transmission timing of the UE.

The scheduler 1215 allocates transmission resource to the UE at an appropriate time in consideration of the buffer state, channel state, and active time of the UE and controls the transceiver to processing the signal transmitted by or to be transmitted to the UE.

Using the proposed method, it is possible to use the improved carrier aggregation and perform communication without malfunctioning.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A power headroom report (PHR) transmission method of a terminal in a wireless communication system, the method comprising:
    detecting an event associated with a PHR triggering;
    identifying whether a random access response message is received for at least one activated secondary cell;
    identifying whether a timing advance timer of the at least one activated secondary cell is running;
    generating PHR corresponding to the at least one secondary cell, if the timing advance timer of the at least one activated secondary cell is running; and
    transmitting the PHR to the primary cell.

2. The method of claim 1, further comprising receiving, before the detecting of the event associated with the PHR triggering, a radio resource control (RRC) connection reconfiguration message including parameters necessary for the terminal to perform a random access procedure to the at least one secondary cell.

3. The method of claim 2, wherein the RRC connection reconfiguration message comprises at least one of a predetermined number of times of transmitting a preamble (preambleTransMax) and a period for receiving a response message after transmitting the preamble (ra-ResponseWindowSize).

4. A power headroom report (PHR) reception method of a base station in a wireless communication system, the method comprising:
    transmitting, to a terminal, an activation medium access control (MAC) control element (CE) message associated with at least one secondary cell; and
    receiving, from the terminal, a PHR generated corresponding to at least one activated secondary cell associated with reception of a random access response message,
    wherein the at least one activated secondary cell of a timing advance timer is running.

5. The method of claim 4, further comprising transmitting, to the terminal, a radio resource control (RRC) connection reconfiguration message including parameters necessary for the terminal to perform random access procedure to the at least one secondary cell before the transmitting of the activation MAC CE message.

6. The method of claim 5, wherein the RRC connection reconfiguration message comprises at least one of a predetermined number of times of transmitting a preamble (preambleTransMax) and a period for receiving a response message after transmitting the preamble (ra-ResponseWindowSize).

7. A terminal transmitting power headroom report (PHR) in a wireless communication system, the terminal comprising:
    a transceiver configured to transmit and receive signal to and from a base station; and
    a controller configured to:
        detect an event associated with a PHR triggering,
        identify whether a random access response message is received for at least one activated secondary cell,
        identify whether a timing advance timer of the at least one activated secondary cell is running,
        generate, if the timing advance timer of the at least one activated secondary cell is running, PHR corresponding to the at least one secondary cell, and
        transmit the PHR to the primary cell.

8. The terminal of claim 7, wherein the controller is further configured to receive, before detecting the event associated with the PHR triggering, a radio resource control (RRC) connection reconfiguration message including parameters necessary for the terminal to perform a random access procedure to the at least one secondary cell.

9. The terminal of claim 8, wherein the RRC connection reconfiguration message comprises at least one of a predetermined number of times of transmitting a preamble (preambleTransMax) and a period for receiving a response message after transmitting the preamble (ra-ResponseWindowSize).

10. A base station receiving power headroom report (PHR) in a wireless communication system, the base station comprising:
    a transceiver configured to transmit and receive signal to and from a terminal; and
    a controller configured to:
        transmit, to the terminal, an activation medium access control (MAC) control element (CE) message associated with at least one secondary cell, and
        receive, from the terminal, a PHR generated corresponding to at least one activated secondary cell associated with reception of a random access response message,
    wherein the at least one activated secondary cell of a timing advance timer is running.

11. The base station of claim 10, wherein the controller is further configured to transmit, to the terminal, a radio resource control (RRC) connection reconfiguration message including parameters necessary for the terminal to perform random access to the secondary cell before the transmitting of the activation MAC CE message.

12. The base station of claim 11, wherein the RRC connection reconfiguration message comprises at least one of a predetermined number of times of transmitting a preamble (preambleTransMax) and a period for receiving a response message after transmitting the preamble (ra-ResponseWindowSize).

* * * * *